United States Patent [19]

Jacquet

[11] 4,301,502
[45] Nov. 17, 1981

[54] ISOLATED D.C. VOLTAGE REGULATING APPARATUS

[75] Inventor: Raymond Jacquet, Paris, France

[73] Assignee: Thomson-CSF, Paris, France

[21] Appl. No.: 973,951

[22] Filed: Dec. 28, 1978

[30] Foreign Application Priority Data

Jan. 3, 1978 [FR] France .................................. 78 00050

[51] Int. Cl.³ ............................................. H02P 13/00
[52] U.S. Cl. .............................................................. 363/79
[58] Field of Search .......................... 323/17, DIG. 1; 363/18–25, 79, 80, 96, 97

[56] References Cited

U.S. PATENT DOCUMENTS

| | | | |
|---|---|---|---|
| 3,818,306 | 6/1974 | Marini | 323/17 X |
| 3,906,333 | 9/1975 | Kalmanash | 323/17 |
| 4,013,939 | 3/1977 | Biess et al. | 323/17 |
| 4,092,708 | 5/1978 | Gerding et al. | 363/80 X |
| 4,128,866 | 12/1978 | Doerre | 363/79 X |
| 4,146,832 | 3/1979 | McConnell | 323/17 |

Primary Examiner—William M. Shoop
Attorney, Agent, or Firm—Cushman, Darby & Cushman

[57] ABSTRACT

A D.C. voltage apparatus providing isolated regulation. A D.C. voltage to be regulated is coupled through a D.C.-D.C. regulator and a D.C.-A.C. converter to the primary winding of a voltage transformer the secondary winding of which is then coupled to a rectifier and filter circuit. A feedback loop including a current transformer coupled to a rectifier and filter circuit and then through a resistive divider to a summer provides an error signal to the D.C.-D.C. regulator. The feedback loop injects into the summer a voltage which is opposite in phase to the output voltage of the D.C.-D.C. regulator which enhances the regulation capability of the device.

2 Claims, 3 Drawing Figures

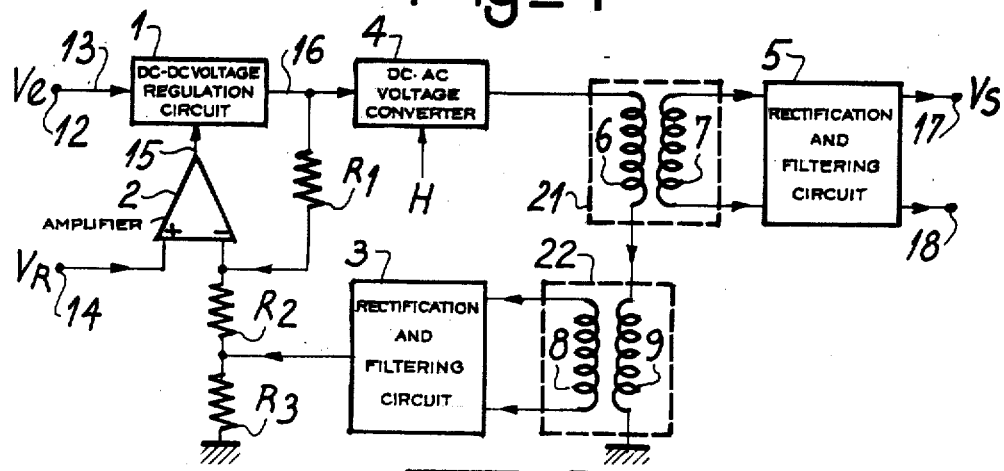
Fig_1
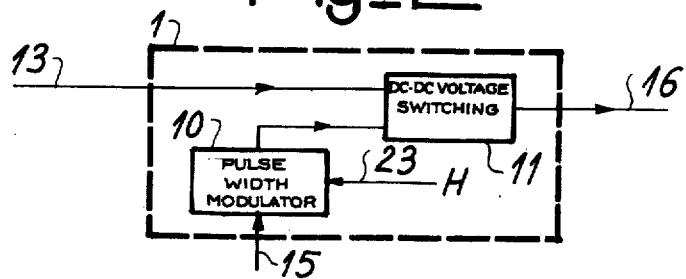
Fig_2
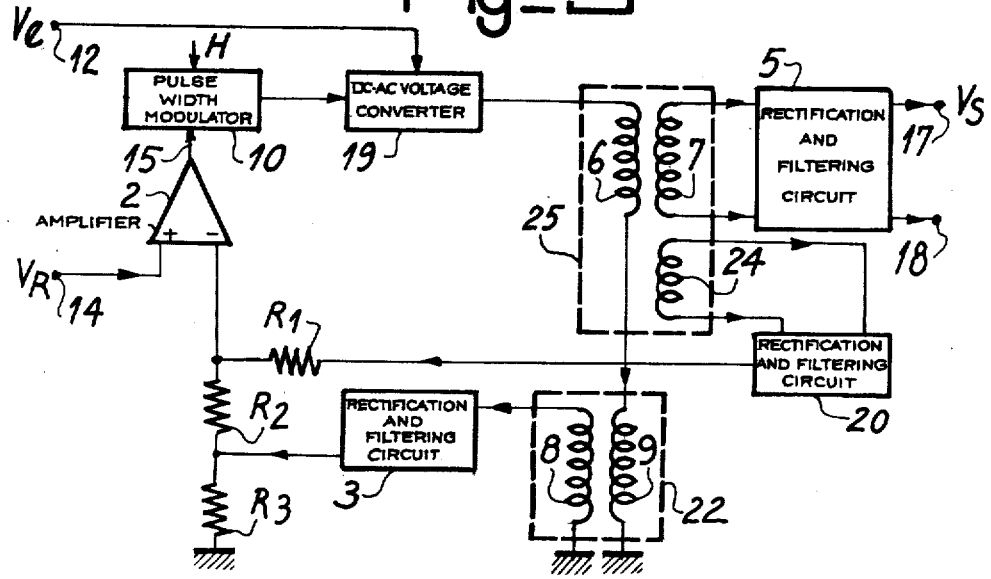
Fig_3

ISOLATED D.C. VOLTAGE REGULATING APPARATUS

This invention relates generally to D.C. voltage regulation and specifically to D.C. voltage regulation for devices requiring isolated regulation and utilization circuits. With even greater specificity, this invention relates to apparatus for regulating the voltage in filament power supplies for travelling wave tubes.

Because travelling wave tubes are coupled to ground through their very high voltage (hereinafter referred to as VHV) supply, they must be capable of handling the high amplitude (up to several thousand volts) impulsive parasitics produced by such supplies. In addition, the supply voltage for a travelling wave tube filament (hereinafter abbreviated as "filament voltage") must be as stable as possible in order to produce a satsifactory tube lifetime.

A well-known technique for stabilizing filament supply is to build these tubes including a transformer to isolate the regulation circuit, located before this transformer, from the rectification and filtering circuit after the transformer which produces the "filament voltage". Thus, the narrow passband of the transformer protects the solid-state components of the regulation circuit from impulsive parasitics. However, the internal impedance of such rectification and filtering circuits is not very low, thereby causing fluctuations in the "filament voltage" when the filament resistance changes or when the tube is replaced.

One solution for overcoming this problem is to tap part of the "filament voltage" from the transformer secondary winding and to reinject it back into the regulation circuit before the transformer in order to compensate the regulation circuit more efficiently for the smallest variations in "filament voltage". This change makes is possible to obtain a rectification and filtering circuit effective internal impedance which is lower than in the preceding case, but such a scheme requires solid-state components which can handle impulsive parasitics.

It is therefore the purpose of this invention to provide a regulating apparatus overcoming the above described disadvantage and limitations. Specifically, the present invention provides a D.C. regulating apparatus for the filament supply of a travelling wave tube or other microwave devices.

As used hereafter, the terms "D.C. - D.C." or "D.C. - A.C." indicate the type of voltage which is respectively present at the input and output of the circuits or devices described.

The present invention provides a D.C. voltage regulating apparatus for isolated regulation device for isolated regulation and utilization circuits.

D.C. voltage $V_e$ to be regulated is coupled to an input of a D.C. - D.C. voltage regulation circuit 1, the output of which is coupled to a D.C. - A.C. voltage converter 4. The output of D.C. - A.C. voltage converter 4 is coupled through the primary winding 6 of a voltage transformer 21 and then through the primary winding 9 of a current transformer 22 to ground. The secondary winding of voltage transformer 21 is coupled to a rectification and filtering circuit 5 having outputs 17-18 coupled to a travelling wave tube device or other device to be powdered by the regulator. The secondary winding 8 of current transformer 22 is coupled to a second rectification and filtering circuit 3, the output of which is coupled to a resistive divider coupled between the output of D.C. - D.C. voltage regulation circuit 1 and ground. A tap of the divider is coupled to the inverting (−) input of an amplifier 2 (acting as an adder) having its output coupled to the error input of D.C. - D.C. voltage regulation circuit 1. A reference voltage is coupled to the noninverting (+) input of amplifier 2. In this manner a feedback loop is created from voltage transform 21 to D.C. - D.C. voltage regulation circuit 1. This feedback loop injects into amplifier 2 a voltage opposite in phase to the output voltage of D.C - D.C. voltage regulation circuit 1, significantly enhancing the regulation capability of the isolated D.C. voltage regulating apparatus according to the present invention.

The attendant advantages of the present invention will be readily apparent as the invention becomes better understood by reference to the following detailed description with the appended claims, when considered in conjunction with the accompanying drawings, wherein:

FIG. 1 is a block diagram of an isolated D.C. voltage regulating apparatus according to the present invention;

FIG. 2 is a detailed block diagram of a variation of D.C. - D.C. voltage regulation circuit 1 shown in FIG. 1;

FIG. 3 is a block diagram of a second embodiment of an isolated D.C. voltage regulating apparatus according to the present invention.

Referring now to the drawings, wherein like reference characters designate like or corresponding parts throughout the several figures, FIG. 1 is a block-/schematic diagram of a voltage regulating apparatus according to the present invention and shows a D.C. - D.C. voltage regulation circuit 1 receiving a D.C. voltage $V_e$ to be regulated at a first input 12, and a control signal provided by an amplifier 2 at a second input 15. D.C. - D.C. voltage regulation circuit 1 includes an output terminal 16 coupled, in parallel, first to ground through a resistive divider including of three series resistors $R_1$, $R_2$, $R_3$ and, second, to the first input of a D.C. - A.C. voltage converter 4. Amplifier 2 receives at a non-inverting (+) input an externally generated reference voltage $V_R$ and at an inverting (−) input a D.C. voltage from the common terminal of resistors $R_1$ and $R_2$. D.C. - A.C. voltage converter 4 receives a control signal H (square wave of fixed frequency) at its second input. Its output is coupled to ground through two windings 6 and 9 in series. These windings are the primary windings of a voltage transformer 21 and a current transformer 22, respectively. The secondary winding 7 of transformer 21 is coupled to a rectification and filtering circuit 5 having two output terminals 17 and 18, for supplying the "filament voltage" of a travelling wave tube (not shown). Output terminal 18 is not coupled to ground as in the case of a conventional power supply, but to the VHV voltage of the travelling wave tube. The secondary winding 8 of current transformer 22 is coupled to a rectification and filtering circuit 3, the output of which is coupled to the common terminal of resistors $R_2$ and $R_3$.

The voltage regulating apparatus operates as follows: amplifier 2 amplifies the error between reference voltage $V_R$ applied to its non-inverting (+) input and the voltage applied to its inverting (−) input. The output signal of amplifier 2 is coupled to the error input on and controls voltage regulating circuit 1 which supplies a regulated D.C. voltage at its output 16. D.C. - A.C. voltage converter 4 coupled to transformer 21 changes the regulated D.C. voltage into a regulated A.C. voltage, and this A.C. voltage is then rectified and filtered by rectification and filtering circuit 5 making it available at output terminals 17 and 18.

The operation of this part of the device is very conventional and well known. However, the internal impedance obtained across terminals 17 and 18, using only the components described above, is not very low, and this causes the regulation to be poor according to variations in the load. An improvement is obtained by means of rectification and filtering circuit 3 associated with resistor $R_3$ and current transformer 22.

A change in the resistance of the travelling wave tube filament causes an opposite change in the D.C. current flowing in the filament, as well as a direct change in the D.C. voltage at its terminals (because the internal impedance across its terminals 17 and 18 is not equal to zero). This D.C. current change in turn causes a change in the A.C. current flowing in the secondary winding of transformer 21 which communicates it (according to its transformation ratio) to the primary windings transformers 21 to 22. The secondary winding 8 of current transformer 22 then communicates this A.C. current change to resistor $R_3$ through rectification and filtering circuit 3, in the form of a change in D.C. current. This produces a voltage change across the terminals of this transistor which must be in opposite phase to the fraction of the output voltage of the voltage regulation circuit 1 (the fraction being obtained by the resistive divider $R_1$, $R_2$ and $R_3$).

Thus, a feedback loop is created including the following essential elements: transformer 22, rectification and filtering circuit 3, and resistor $R_3$. This feedback loop is capable of improving voltage regulation as indicated by calculations and confirmed by experiments.

For example, the results indicated in the following table have been obtained:

|  | CURRENT | VOLTAGE |
| --- | --- | --- |
|  | 0.4 A | 5.500 V |
| without the feedback loop | 0.8 A | 5.200 V |
| with the feedback loop | 0.8 A | 5.490 V |

It should be noted that this example uses a conventional type D.C. - D.C. voltage regulation circuit 1 (containing a bipolar transistor or a group of such transistors). Another type of regulation circuit which may be used is shown in FIG. 2.

Referring now to FIG. 2 which is a detailed block diagram of one possible variation of D.C. - D.C. voltage regulation circuit 1, a pulse width modulator 10 includes a first input 15, a second input 23 which receives a clock signal H, and an output connected to the first input of a D.C. - D.C. voltage switching converter 11. This converter is of a known type (i.e. of the "flyback" type) and contains a second input 13 and an output 16.

The operation of this D.C. - D.C. voltage regulation circuit is also conventional and well known.

The output signal of amplifier 2 (shown in FIG. 1) controls the width of the pulses supplied by modulator 10. These pulses in turn control the switching of the input voltage $V_e$ (shown in FIG. 1) to be regulated. The switched voltage is then rectified, filtered and made available at terminal 16 of D.C. - D.C. switching voltage regulation circuit 1.

Other applications of this feedback loop are possible, one of which is shown in block/schematic FIG. 3 which is a second embodiment of the voltage regulating apparatus according to the present invention.

Referring now to FIG. 3, amplifier 2, pulse-width modulator 10, resistors $R_2$ and $R_3$, rectification and filtering circuits 3 and 5, transformer 22, windings 6 and 7 are all identical to those in FIGS. 1 and 2 and are interconnected in the same manner. Windings 6 and 7 are the primary and first secondary windings of transformer 23, respectively. In addition, a second winding 24 of the secondary of the latter transformer is coupled to a rectification and filtering circuit 20, the output of which is coupled to the inverting ($-$) input of amplifier 2 through resistor $R_1$. Also, the output of pulse width modulator 10 is coupled to a first input of a D.C. - A.C. voltage converter 19 having a second input to which the unregulated voltage $V_e$ is applied. The output of converter 19 is coupled to winding 6 of transformer 25.

The operation of this embodiment is identical to that the embodiment shown in FIG. 1, except for the following differences:

The regulated voltage is an A.C. voltage, without any intermediate regulated D.C. voltage but as in the previous embodiment, resistor $R_1$ must be coupled to a regulated D.C. voltage source; thereby creating the need for the second winding 24 and for rectification and filtering circuit 20. In addition, pulse width modulator 10 directly controls D.C. - A.C. voltage converter 19.

The invention is not simply confined to the regulation of the supply voltage for travelling wave tube filaments. It also finds application to the regulation of the supply voltage for microwave tube filaments in general and to devices requiring a D.C. voltage source with isolated regulation and utilization circuits.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An isolated D.C. voltage regulating apparatus comprising:

a D.C. - D.C. voltage regulation circuit having an input for receiving a D.C. voltage to be regulated, a control input, and an output;

a D.C. - A.C. voltage converter having an input coupled to the output of said D.C. - D.C. voltage regulation circuit and an output;

first, second and third resistors;

an error amplifier having a first input for receiving a reference voltage, a second input coupled to the output of said D.C. - D.C. voltage regulator through said first resistor and an output coupled to the control input of said D.C. - D.C. voltage regulation circuit;

a voltage transformer having a primary winding coupled to the output of said D.C. - A.C. voltage converter and a secondary winding;

a first rectification and filtering circuit coupled to the secondary winding of said voltage transformer, for supplying a regulated output for said isolated D.C. voltage regulating apparatus;

a current transformer having a primary winding coupled in series between the primary winding of said voltage transformer and ground and a seconday winding; and a second rectification and filering circuit having an input coupled to the secondary winding of said current transformer and an output coupled to the second input of the error amplifier through the second resistor and to the ground through the third resistor.

2. An isolated voltage regulating apparatus comprising:
- a D.C. - A.C. voltage regulator/converter system having an input for receiving a D.C. voltage to be regulated, a control input and an output;
- an error amplifier having a first input for receiving a reference voltage, a second input and an output coupled to the control input of said D.C. - A.C. voltage regulator/converter system;
- a voltage transformer having a primary winding coupled to the output of said D.C. - A.C. voltage regulator/converter and first and second secondary windings;
- a first rectification and filtering circuit coupled to said first secondary winding of said voltage transformer, for supplying a regulated output for said isolated D.C. voltage regulating apparatus;
- a current transformer having a primary winding coupled in series between the primary winding of said voltage transformer and ground and a secondary winding;
- first, second and third resistors;
- a second rectification and filtering circuit having an input coupled to the secondary winding of the current transformer and an output coupled to the second input of the error amplifier through said second resistor and to the ground through said third resistor; and
- a third rectification and filtering circuit having an input coupled to the second secondary of the voltage transformer and an output coupled to the second input of the error amplifier through said first resistor.

* * * * *